US008866097B2

(12) United States Patent
Meng

(10) Patent No.: US 8,866,097 B2
(45) Date of Patent: Oct. 21, 2014

(54) DETECTOR APPARATUS HAVING A HYBRID PIXEL-WAVEFORM READOUT SYSTEM

(71) Applicant: The Board of Trustees of the University of Illinois, Urbana, IL (US)

(72) Inventor: Ling-Jian Meng, Champaign, IL (US)

(73) Assignee: The Board of Trustees of the University of Illinois, Urbana, IL (US)

( * ) Notice: Subject to any disclaimer, the term of this patent is extended or adjusted under 35 U.S.C. 154(b) by 0 days.

(21) Appl. No.: 13/781,223

(22) Filed: Feb. 28, 2013

(65) Prior Publication Data

US 2013/0284938 A1   Oct. 31, 2013

Related U.S. Application Data

(60) Provisional application No. 61/604,742, filed on Feb. 29, 2012.

(51) Int. Cl.
*G01T 1/24* (2006.01)

(52) U.S. Cl.
CPC .. *G01T 1/247* (2013.01); *G01T 1/24* (2013.01)
USPC .................................................. 250/370.09

(58) Field of Classification Search
CPC ................................ G01T 1/24; G01T 1/247
USPC ....................................... 250/370.01, 370.09
See application file for complete search history.

(56) References Cited

U.S. PATENT DOCUMENTS 7,291,841 B2   11/2007   Nelson et al.

FOREIGN PATENT DOCUMENTS

| EP | 1 754 982 | 2/2007 |
|---|---|---|
| EP | 1 798 574 | 6/2007 |
| EP | 1 801 616 | 6/2007 |
| EP | 1 852 716 | 11/2007 |

OTHER PUBLICATIONS

Brzymialkiewicz, C. N., et al., "Evaluation of fully 3-D emission mammotomography with a compact cadmium zinc telluride detector," *IEEE 15 Transactions on Medical Imaging*, vol. 24, Jul. 2005 pp. 868-877.
Guerin, L., et al., "A new architecture for pixellated solid state gamma camera used in nuclear medicine," *IEEE Transactions on Nuclear Science*, vol. 55, Jun. 2008, pp. 1573-1580.

(Continued)

*Primary Examiner* — Mark R Gaworecki
(74) *Attorney, Agent, or Firm* — Greer, Burns & Crain Ltd.

(57) ABSTRACT

A gamma ray detector apparatus comprises a solid state detector that includes a plurality of anode pixels and at least one cathode. The solid state detector is configured for receiving gamma rays during an interaction and inducing a signal in an anode pixel and in a cathode. An anode pixel readout circuit is coupled to the plurality of anode pixels and is configured to read out and process the induced signal in the anode pixel and provide triggering and addressing information. A waveform sampling circuit is coupled to the at least one cathode and configured to read out and process the induced signal in the cathode and determine energy of the interaction, timing of the interaction, and depth of interaction.

19 Claims, 2 Drawing Sheets

(56) References Cited

OTHER PUBLICATIONS

Kim, H., et al., "SemiSPECT: A small-animal single-photon emission computed tomography (SPECT) imager based on eight cadmium zinc telluride (CZT) detector arrays," *Medical Physics*, vol. 33, Feb. 2006 pp. 465-474.

Meng, L. J., et al., "Preliminary evaluation of a novel energy-resolved photon-counting gamma ray detector," *Nuclear Instruments & Methods in Physics Research A*, vol. 604, Jun. 11 2009, pp. 548-554.

Verger, L., et al., "Performance and perspectives of a CdZnTe-based gamma camera for medical imaging," *IEEE Transactions on Nuclear Science*, vol. 51, pp. 3111-5 3117, Dec. 2004.

Verger, L., et al., "New Perspectives in Gamma ray Imaging with CdZnTe/CdTe", 14th IEEE-RSTD Rome, Oct. 16-22, 2004, pp. 1-30.

Jung, G., et al., "Testing of Pixellated CZT and CdTe Detectors at 200µ level", *Integrated Circuits, ISIC '09. Proceedings of the 2009 12th International Symposium on,* Dec. 14-16, 2009, pp. 187-190.

Mikkelsen, S., et al., "An ASIC for Multi Energy X ray counting", *Nuclear Science Symposium Conference Record, 2008. NSS '08. IEEE,* Oct. 19-25, 2008, pp. 1996-2001.

Meng, L.-J., et al., "Development of Small-Pixel CZT and CdTe Detectors with Hybrid Pixel—Waveform Readout System", *TIPP 2011—2nd International Conference on Technology Instrumentation in Particle Physics,* Jun. 9, 2011, 27 pages, https://indico.cern.ch/event/102998/contribution/468.

Cai, L., et al., "A prototype adaptive SPECT system with self-optimized angular sampling", *Nuclear Science Symposium and Medical Imaging Conference (NSS/MIC),* 2011 IEEE, Oct. 23-29, 2011, pp. 4402-4406.

DETECTOR APPARATUS HAVING A HYBRID PIXEL-WAVEFORM READOUT SYSTEM

PRIORITY CLAIM AND REFERENCE TO RELATED APPLICATION

This application claims the benefit of U.S. Provisional Patent Application Ser. No. 61/604,742, filed Feb. 29, 2012, under 35 U.S.C. §119. U.S. Provisional Patent Application Ser. No. 61/604,742 is incorporated in its entirety by reference herein.

STATEMENT OF GOVERNMENT INTEREST

This invention was made with government support under contract No. DE-SC0001826 awarded by the Department of Energy and contract No. R21 CA135736 awarded by the National Institutes of Health. The Government has certain rights in this invention.

FIELD OF THE INVENTION

A field of the invention is gamma ray and neutron detectors. Particular applications include nuclear medicine, security, and astrophysics applications.

BACKGROUND OF THE INVENTION

Gamma ray radiation detection (gamma ray detection) is desirable for various applications. As one non-limiting example, methods such as single-photon emission computed tomography (SPECT) and positron emission tomography (PET) detect gamma ray radiation for biomedical imaging.

One method of gamma ray detection employs one or more scintillator detectors that emit a flash of light in response to a gamma ray interaction with the detector. This flash of light is typically detected using photomultiplier tubes (PMTs), which convert the flash of light to electrons for processing by a readout system having suitable circuitry. PMTs, however, can be quite large. This limits portability or availability of some gamma ray detection systems. Further, large amounts of shielding (e.g., lead shielding of 500 pounds or more for some imaging applications) may be required.

On the other hand, solid state detectors increasingly are being used for gamma ray detection. Solid state detectors include a material that directly converts gamma rays to electrons, which electrons can be processed by readout systems coupled to the solid state detectors. Example materials for solid state gamma ray detection include detectors that can convert gamma rays to electrons at room temperature, such as cadmium zinc telluride (CdZnTe or CZT), cadmium telluride (CdTe), and others. CZT and CdTe detectors have been widely used for biomedical imaging applications, for instance.

Such solid state detectors have the potential to offer the combination of excellent energy resolution, good spatial resolution, and at least adequate detection efficiency for gamma rays emitted by common single photon emitters, such as I-125, Tc-99m, I-123, In-111, and TI-201. In recent years, the use of small-pixel CZT or CdTe-based imaging sensors to replace scintillation detectors for high-resolution SPECT imaging applications has been evaluated in the art. There has also been extensive effort in the art towards building positron emission tomography (PET) systems based on CZT and CdTe detectors.

However, certain problems can occur with small-pixel CZT and CdTe detectors designed for ultrahigh resolution gamma ray imaging applications. One problem is that charge (electron) collection efficiency is severely degraded by charge loss and charge sharing effects when the physical dimension of anode pixels approaches the size of the electron cloud created by gamma ray interactions (typically a few hundred microns). These effects depredate the accuracy of energy, depth of interaction (DOI), and timing information that can be obtained from the small anode pixels.

Another problem is that as future detectors are pushing for higher spatial resolutions, smaller and smaller pixels have to be used. This typically leads to a very large number of pixels to be read out and requires highly complex readout circuitry to extract the energy, spatial, and timing information needed for gamma ray imaging applications.

SUMMARY OF THE INVENTION

A gamma ray detector apparatus is provided by example embodiments of the invention. An example gamma ray apparatus comprises a solid state detector that includes a plurality of anode pixels and at least one cathode. The solid state detector is configured for receiving gamma rays during an interaction and inducing a signal in an anode pixel and in a cathode. An anode pixel readout circuit is coupled to the plurality of anode pixels and is configured to read out and process the induced signal in the anode pixel and provide triggering and addressing information. A waveform sampling circuit is coupled to the at least one cathode and is configured to read out and process the induced signal in the cathode and determine energy of the interaction, timing of the interaction, and depth of interaction.

DETAILED DESCRIPTION

An example embodiment of the invention provides, among other things, a gamma ray radiation detector apparatus. The detector apparatus includes at least one solid state gamma ray detector having one or more anode pixels and one or more cathodes. Preferably, the gamma ray detector is highly pixelated (e.g., having at least a few hundred μm pitch size). A hybrid pixel-waveform (HPWF) readout system is provided to read out signals from the one or more anode signals and the one or more anodes. Particularly, the HPWF readout system receives and processes signals from the one or more anode pixels to determine an interaction location, and in coincidence receives and processes a waveform from the one or more cathodes to determine energy, timing, and/or depth-of-interaction (DOI). The solid state gamma ray detector can be made of a semiconductor material, such as a room temperature semiconductor material. Example semiconductor materials for the solid state gamma ray detectors include CdZnTe, CdTe, $HgI_2$, and other semiconductor detector materials.

An example HPWF readout system uses a pixel readout circuit coupled to the one or more anode pixels, which receives signals from the anode pixels and provides a pixel address. The pixel readout circuit works in coincidence with a waveform sampling circuit coupled to the one or more cathodes to sample a cathode waveform and provide at least one of energy, timing, and depth-of-interaction (DOI) information.

The combination of pixel readout electronics and high-speed waveform sampling circuit for reading out semiconductor detectors is believed to be unique. An example embodiment can provide an effective, relatively simple solution for room temperature semiconductors for imaging applications.

Preferred embodiments will now be discussed with respect to the drawings. The drawings include schematic figures that are not to scale, which will be fully understood by skilled artisans with reference to the accompanying description. Features may be exaggerated for purposes of illustration. From the preferred embodiments, artisans will recognize additional features and broader aspects of the invention.

Figure 1:
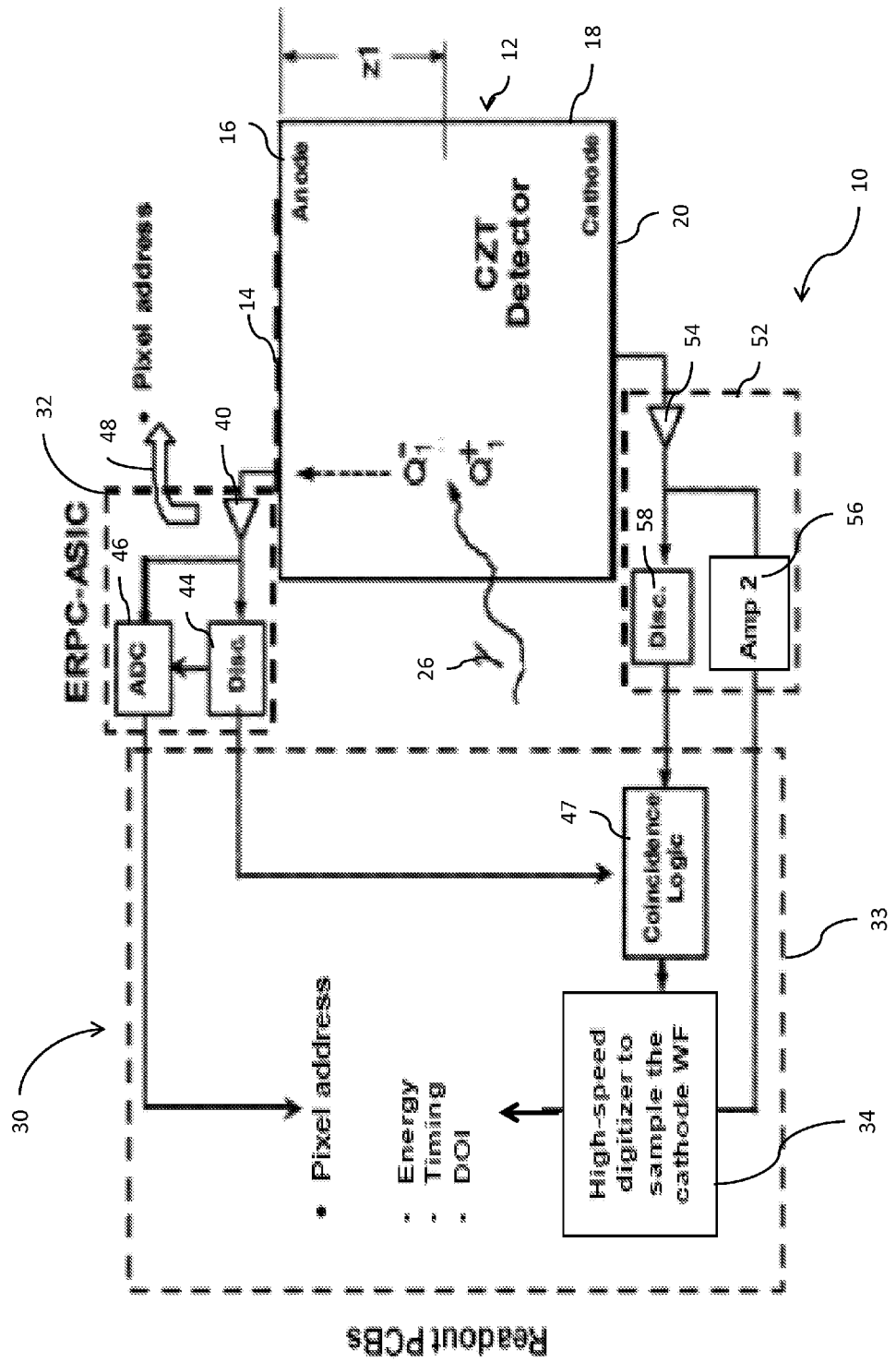
FIG. 1 shows an example solid state gamma ray detection apparatus having a hybrid pixel-waveform (HPWF) readout system according to an embodiment of the invention.
Figure 2:
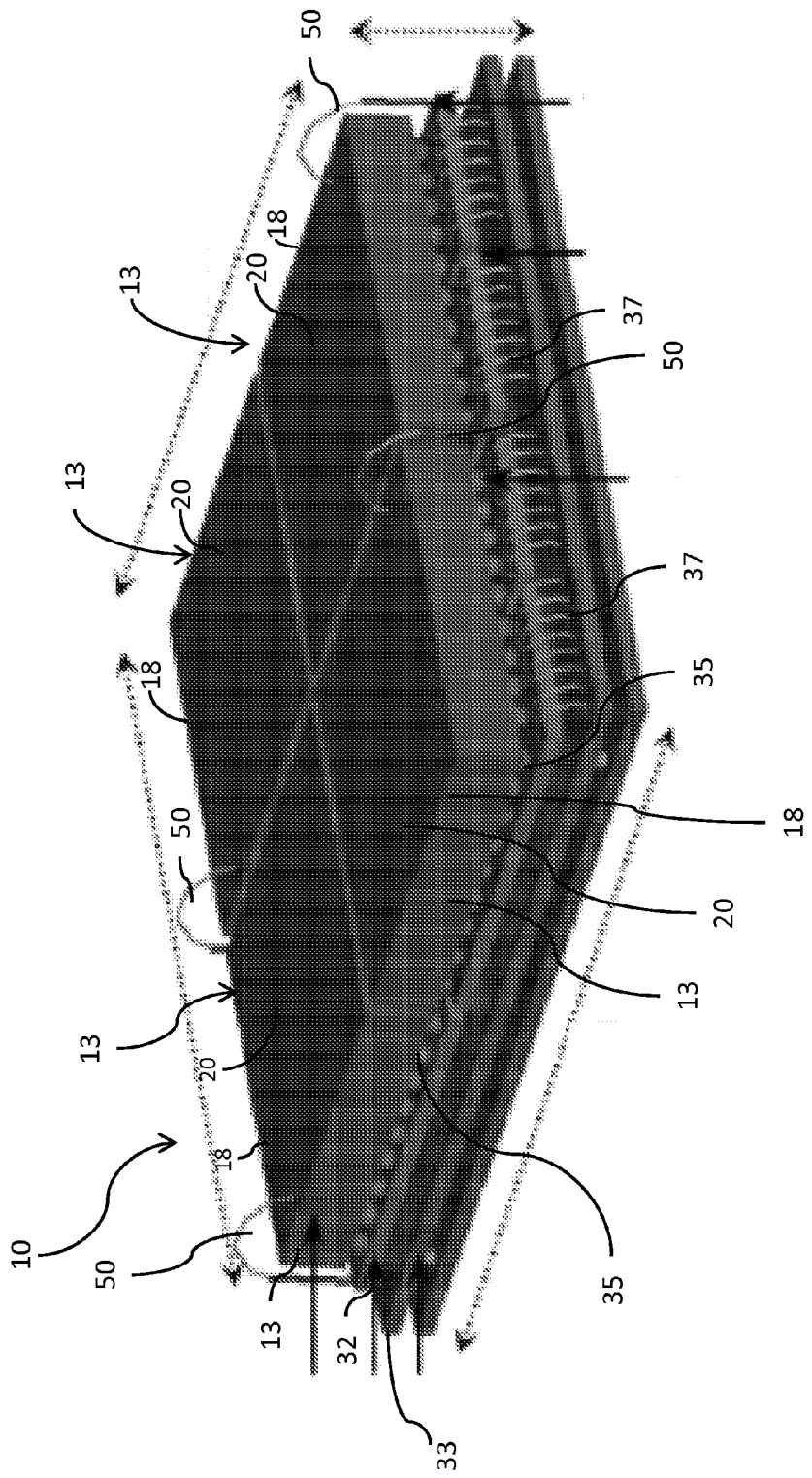
FIG. 2 is a perspective view of an example solid state gamma ray detection apparatus.

FIGS. 1-2 show an example solid state gamma ray detection apparatus 10, where FIG. 1 shows a schematic design, and FIG. 2 shows the example apparatus in perspective. The detection apparatus 10 can operate as a single apparatus, or can be employed as a module for larger gamma ray detection devices.

The example detection apparatus 10 includes a solid state gamma ray detector (solid state detector) 12, which in an example embodiment includes one or more detector hybrids such as crystals 13 (four are shown in FIG. 2) formed of semiconductor material, and preferably of room temperature semiconductor material. An example crystal 13 thickness is about 1-5 mm, though this can vary. In an example embodiment, the semiconductor material for the crystals 13 is CZT or a high-resistivity p-type CdTe. A two-dimensional array (or other arrangement) of anode pixels 14 embodied in metal contacts (for instance) is disposed at a first side (anode side) 16 of the solid state detector 12, on surfaces of the crystals 13. In an example embodiment a steering grid is not provided between anode pixels, but in other embodiments a steering grid may be provided. A cathode side 18 is disposed at the opposing side of the solid state detector 12, and includes a cathode 20 for each of the crystals 13. The cathode 20 can be embodied in, for instance, a thin metal contact, such as gold or other suitable metals. Collimators (not shown) can be provided, as will be appreciated by one of ordinary skill in the art.

An example anode pixel array for the solid state detector 12 includes 32×64 pixels having a pixel pitch size of 0.35 mm×0.35 mm (though the number of pixels and/or the pitch can be greater or smaller), and in a particular example embodiment the anode pixels are 300 μm×300 μm pixels with 50 μm gaps between adjacent pixels. The anode pixels 14 sense X-Y positions of gamma ray interactions with the solid state detector 12. Ohmic contacts (not shown) can be coupled to both the anode side 16 and the cathode side 18 for coupling the anode pixels 14 and the cathodes 20 to readout channels (for 32×64 anode pixel array, 2048 readout channels). A bias voltage (e.g., −200 V, though this can be higher or lower) can be applied to the cathode side 18. The $Z_1$ direction represents a depth-of-interaction (DOI) between the anode side 16 and the cathode side 18.

During an individual gamma ray interaction a gamma ray 26, which may be, but need not be, one of a coincidence pair, impinges on the solid state detector 12, generating charge clouds and causing a charge Q+, Q− to drift. This induces a signal amplitude on a corresponding anode pixel 14 and a signal on a corresponding cathode 20.

A readout system 30 is coupled to the solid state detector. For reading out the anode pixels 14, an example readout system 30 includes an anode pixel readout circuit 32, for instance, embodied in one or more application specific integrated circuits (ASICs) (eight are provided in FIG. 2) that is configured for energy resolved photon counting (ERPC). Accordingly, a particular example anode pixel readout circuit 32 can also be referred to as an ERPC-ASIC, though other suitable pixel readout circuits can also be used. The readout system 30 further includes a waveform sampling circuit 34 for reading out signals, e.g., waveforms, from the cathodes 20. This waveform sampling circuit 34 can be, for instance, provided in a readout circuit printed circuit board (PCB) 33, which can also be configured for reading out the output of the anode pixel readout circuit 32 (or can be a separate PCB). The readout system 30 thus is configured for reading anode pixel signals using the anode pixel readout circuit 32 and reading waveforms of the cathodes 20 using the waveform sampling circuit 34. Accordingly, the example readout system 30 provides a hybrid pixel-waveform (HPWF) readout system. The readout system 30 can be connected to a host computer, such as but not limited to a personal computer (PC) (not shown) via universal serial bus (USB) (not shown) or other suitable interface.

The anode pixel readout circuit 32 can be, but need not be, a highly simplified pixel circuit (e.g., with only triggering and addressing capability, though other functions could also be provided). Such pixel circuitry can be extended to handle a larger number of small pixels (e.g., <100 micron in dimension) for solid state detectors. Components of a non-limiting example anode pixel readout circuit 32 can be provided by an ASIC such as that disclosed in L. J. Meng, J. W. Tan, K. Spartiotis, and T. Schulman, "Preliminary evaluation of a novel energy-resolved photon-counting gamma ray detector," Nuclear Instruments & Methods in Physics Research Section a-Accelerators Spectrometers Detectors and Associated Equipment, vol. 604, pp. 548-554, Jun. 11, 2009, which is incorporated in its entirety by reference herein. However, other suitable pixel readout circuits can be used, as will be appreciated by those of ordinary skill in the art, and the pixel readout circuit 32 is not limited to the example ASIC. Other pixel readout circuits can be provided that are suitably configured for additional or alternative features, such as but not limited to incorporating multiple gain levels (e.g., three, though this number can vary) for handling different gamma ray energies, and/or for allowing a lower energy threshold, but this is not required.

In a particular embodiment the anode pixel readout circuit 32 includes two-dimensional (2-D) multi-pixel circuitry that generally align with and are electrically coupled to the anode pixels 14 (e.g., via bump bonds 35 such as indium (or other material) bump bonds that couple to ohmic contacts on the anode pixels, though other electric couplings can be used) to provide channels that determine the X-Y positions of interactions. Wire-bonding pads, including control signals, power feeds, and output signals, can be (but need not be) disposed on one side of the anode pixel readout circuit 32, as shown in FIG. 2, and as taught in L. J. Meng et al. A particular example anode pixel readout circuit 32 has dimensions of approximately 22 mm×11 mm, and includes 2048 readout channels arranged in an array of 32×64 CMOS pixels 38. A particular example pixel pitch size is 0.35 mm×0.35 mm, which matches the example anode pixel 14 configuration of the solid state detector 12. The dimensions, arrays, and/or pitch size can vary, however.

Each channel (e.g., coupled to each anode pixel 14) can include an amplifier 40, e.g., an AC-coupled charge-sensitive amplifier, which is coupled to a peak/hold circuit, a comparator (discriminator) 44, and a counter 46, such as but not limited to a multi-function counter that is used for both photon counting and A-to-D conversion. A non-limiting example amplifier 40 has a shaping time of ~1 μs.

In an example embodiment, the anode pixel readout circuit 32 can be simplified, for instance being configured for providing essentially triggering and addressing capability. However, other anode pixel readout circuits can also be configured for other functions. As shown in FIG. 1, the anode pixel readout circuit 32 can also include or be coupled to various logic units, such as but not limited to coincidence logic 47 (disposed on the readout PCB 33 in FIG. 1) and address decoding 48, as well as logic for controlling and for selection between readout modes (not shown). A control unit such as but not limited to a field programmable gate array (FPGA) (not shown), on board computer, etc., can control readout operation.

The waveform sampling circuit 34 can be disposed on the readout PCB 33 as shown in FIG. 2, or alternatively may be incorporated into a circuit board with all or part of the anode pixel readout circuit 32. Suitable signal couplings such as but not limited to wire bonds 37 can be provided to couple signals between the board including the anode pixel readout circuit 32 and the readout PCB 33. An example waveform sampling circuit 34 includes a high speed digitizer coupled to each of the cathodes 20, such as via wire bonds 50 (a cathode signal out) to read out the pulse-waveform induced on each cathode. The digitized cathode waveform can provide precise timing, energy, and DOI information for gamma ray interactions. A non-limiting example high speed digitizer for the waveform sampling circuit 34 is U1084A, from Agilent Technologies.

Coupled between each of the cathodes 20 and the waveform sampling circuit 34, is a front end 52. The front end 52 includes an amplifier such as a discrete pre-amplifier 54, a non-limiting example of which is Amptek A-250. The amplifier 54 can be integrated on the PCB 33 containing the waveform sampling circuit 34, or on a separate PCB. An output of the pre-amplifier 54 can be coupled to an additional amplifier such as a high-bandwidth amplifier 56, a non-limiting example of which is LNA-2000, RF Bay. The example high-bandwidth amplifier 56, which can (but need not be) integrated on the PCB 33 or a separate PCB, amplifies the output of the pre-amplifier 54 by, for instance, a factor of twenty (though this amount can be larger or smaller). The digitizer 34 is coupled to the output of the high-bandwidth amplifier 56. A comparator (discriminator) 58 is also coupled to the output of the pre-amplifier 54, and the output of the comparator is fed to the coincidence logic 47.

In an example operation the anode pixel readout circuitry 32 reads out and processes the anode pixel 14 signals to determine a pixel address. In coincidence with the operation of the anode pixel readout circuitry 32, the waveform sampling circuitry 34 samples the cathode 20 waveforms to determine interaction energy, timing, and depth-of-interaction (DOI) information. The coincidence logic 47 processes both the anode pixel 12 and cathode 20 signals.

In an example processing method, both the anode pixel readout circuit 32 and the front end circuitry 52 provide fast timing signal for the control unit to determine anode-cathode signal pairs belong to the same gamma ray interaction. The amplified signals from the anode pixels provide X-Y position of the interaction, and the energy deposition. The waveform sampling circuit 34 records the amplified cathode waveforms, and uses digital waveform processing to provide the energy, interaction timing information, and also provide the depth-of-interaction (DOI) information by deriving the charge (both electron and hole) drifting time. The 3-D interaction location, energy and timing information can be used to determine the energy deposition and precisely localize the gamma ray interactions. This information could be used in both spectroscopy and imaging applications.

Example configurations provide one or more benefits for ultrahigh resolution CZT and CdTe detectors used in high-rate application. For example, the example detection apparatus 10 allows for the use of a highly simplified circuit (e.g., only triggering and addressing capability) for readout of the anode pixels 14, which can be extended to handle a larger number of small pixels (e.g., below 100 micron in dimension). Further, using the cathode waveform provides an accurate estimate of the DOI, without requiring precise signal amplitude information from the anode pixels 14. Additionally, use of cathode waveforms allows timing information that can be more precise than analogue triggering on either the cathodes 18 or the anode pixels 14.

The gamma ray detectors 10 can be used alone or as modular detectors in devices such as, but not limited to, gamma cameras, biomedical imaging devices and systems (e.g., PET and SPECT systems), radiation detectors, and other devices. Multiple modular gamma ray detectors can be used in combination according to methods that will be apparent to those of ordinary skill in the art. The example gamma ray detection apparatus 10 can provide a highly effective yet relatively simple solution for room temperature semiconductors for imaging and detection applications.

While various embodiments of the present invention have been shown and described, it should be understood that other modifications, substitutions, and alternatives are apparent to one of ordinary skill in the art. Such modifications, substitutions, and alternatives can be made without departing from the spirit and scope of the invention, which should be determined from the appended claims.

Various features of the invention are set forth in the appended claims.

What is claimed is:

1. A gamma ray detector apparatus comprising:
   a solid state detector comprising a plurality of anode pixels and at least one cathode, the solid state detector being configured for receiving gamma rays during an interaction and inducing a signal in an anode pixel and in a cathode;
   an anode pixel readout circuit coupled to the plurality of anode pixels and configured to read out and process the induced signal in the anode pixel and provide triggering and addressing information; and
   a waveform sampling circuit coupled to the at least one cathode and configured to read out and process the induced signal in the cathode and determine energy of the interaction, timing of the interaction, and depth of interaction.

2. The gamma ray detector of claim 1, wherein the solid state detector comprises a room temperature semiconductor crystal.

3. The gamma ray detector of claim 2, wherein the room temperature semiconductor crystal comprises one or more of CZT and CdTe.

4. The gamma ray detector of claim 1, wherein the anode pixel circuit is configured only to provide triggering and addressing information from the interaction.

5. The gamma ray detector of claim 1, wherein the anode pixel circuit is configured for energy resolved photon counting.

6. The gamma ray detector of claim 1, wherein the anode pixel circuit comprises an application specific integrated circuit (ASIC).

7. The gamma ray detector of claim 1, wherein the anode pixel circuit comprises:
   an amplifier coupled to each of the anode pixels;
   a peak/hold circuit coupled to the amplifier;
   a comparator coupled to the peak/hold circuit; and
   a counter.

8. The gamma ray detector of claim 1, further comprising:
   a readout printed circuit board (PCB) coupled to the anode pixel circuitry and to the at least one cathode;
   wherein the waveform sampling circuit is disposed on the readout printed circuit board.

9. The gamma ray detector of claim 1, wherein the waveform sampling circuit comprises a high speed digitizer coupled to the at least one cathode and configured to sample a waveform of the induced cathode signal.

10. The gamma ray detector of claim 1, further comprising:
    at least one amplifier coupled to the at least one cathode and configured to amplify the induced signal from the cathode.

11. The gamma ray detector of claim 1, further comprising:
    a pre-amplifier coupled to the at least one cathode;
    a high-bandwidth amplifier coupled to an output of the pre-amplifier; and
    a comparator coupled to the output of the pre-amplifier;
    wherein an output of the high-bandwidth amplifier is coupled to the waveform sampling circuit.

12. An imaging apparatus including the gamma ray detection apparatus of claim 1.

13. The imaging apparatus of claim 12, wherein the imaging apparatus comprises at least one of a PET and a SPECT system.

14. A radiation detection apparatus including the gamma ray detection apparatus of claim 1.

15. A method for processing anode and cathode signals from a solid state gamma ray detector after a gamma ray interaction, the method comprising:
    receiving the anode signals by an anode pixel readout circuit;
    the anode pixel readout circuit processing the anode signals and determining a pixel address for the gamma ray interaction;
    receiving the cathode signals by a waveform sampling circuit; and
    in coincidence with said processing the anode signals, the waveform sampling circuit processing the cathode signals and determining energy, timing, and depth of the gamma ray interaction.

16. The method of claim 15, wherein the anode pixel circuit processing comprises:
    providing a fast timing signal for the anode signals; and
    determining an X-Y position and energy deposition of the gamma ray interaction.

17. The method of claim 15, wherein the waveform sampling circuit processing comprises:
    recording amplified cathode waveforms; and
    deriving a charge drifting time from the amplified cathode waveforms.

18. The method of claim 15, further comprising:
    determining whether the gamma ray interaction is part of a coincidence.

19. An apparatus for processing signals from at least one anode pixel and at least one cathode that are induced by a gamma ray interaction in a room temperature solid state gamma ray detector, the apparatus comprising:
    an anode pixel readout circuit coupled to the plurality of anode pixels and configured to read out and process the induced signal in the anode pixel and provide triggering and addressing information in X and Y directions; and
    a waveform sampling circuit coupled to the at least one cathode and configured to read out and process the induced signal in the cathode and determine energy of the interaction, timing of the interaction, and a Z-direction depth of interaction.

* * * * *